United States Patent
Pepin et al.

(10) Patent No.: US 11,671,446 B2
(45) Date of Patent: Jun. 6, 2023

(54) AUTOMATIC DETECTION AND MITIGATION OF DENIAL-OF-SERVICE ATTACKS

(71) Applicant: Google LLC, Mountain View, CA (US)

(72) Inventors: Francois Pepin, Mountain View, CA (US); Andre Lloyd Perlee Harder, Melbourne Beach, FL (US); Prajakta Joshi, Palo Alto, CA (US); Amitabha Roy, Kitchener (CA); Saila Talagadadeevi, Los Altos Hills, CA (US); Emil Kiner, Sunnyvale, CA (US); Chia-Tung Kuo, Mountain View, CA (US); Jiayu Ye, Mountain View, CA (US)

(73) Assignee: Google LLC, Mountain View, CA (US)

( * ) Notice: Subject to any disclaimer, the term of this patent is extended or adjusted under 35 U.S.C. 154(b) by 173 days.

(21) Appl. No.: 17/120,050

(22) Filed: Dec. 11, 2020

(65) Prior Publication Data
US 2022/0191242 A1   Jun. 16, 2022

(51) Int. Cl.
*H04L 9/40* (2022.01)
*H04L 41/142* (2022.01)

(52) U.S. Cl.
CPC ........ *H04L 63/1458* (2013.01); *H04L 41/142* (2013.01); *H04L 63/0263* (2013.01); *H04L 63/1416* (2013.01)

(58) Field of Classification Search
CPC ....... G06N 20/00; H04L 41/142; H04L 41/16; H04L 63/0263; H04L 63/1416; H04L 63/1425; H04L 63/1458
See application file for complete search history.

(56) References Cited

U.S. PATENT DOCUMENTS

| | | | | |
|---|---|---|---|---|
| 11,310,205 B2* | 4/2022 | Kleopa | ............... | H04L 63/1425 |
| 2011/0239295 A1* | 9/2011 | Sorge | .................. | H04L 65/1079 726/22 |
| 2016/0196430 A1* | 7/2016 | Chen | .................... | G06F 16/285 726/23 |
| 2016/0352765 A1* | 12/2016 | Mermoud | ........... | H04L 63/1458 |
| 2017/0310703 A1* | 10/2017 | Ackerman | .......... | H04L 63/1425 |
| 2020/0382537 A1* | 12/2020 | Compton | ............ | H04L 63/1425 |
| 2021/0034994 A1* | 2/2021 | Stocker | .................... | G06N 5/04 |
| 2021/0064933 A1* | 3/2021 | Bos | ...................... | G06K 9/6256 |

* cited by examiner

*Primary Examiner* — Daniel B Potratz
*Assistant Examiner* — Matthias Habtegeorgis
(74) *Attorney, Agent, or Firm* — Honigman LLP; Brett A. Krueger

(57) ABSTRACT

A method for mitigating network abuse includes obtaining a first set of network traffic messages of network traffic currently received by a network service and determining, via a first model, whether network abuse is occurring based on the first set of network traffic messages. When the network abuse is occurring, the method includes obtaining a second set of current network traffic messages. The method also includes, for each network traffic message in the second set of network traffic messages, labeling, via a second model, the network traffic message as an abusing network traffic message or a non-abusing network traffic message. The method also includes generating, via a third model, at least one network traffic rule. Each network traffic rule, when implemented, reduces an effect of the abusing network traffic messages.

20 Claims, 7 Drawing Sheets

AUTOMATIC DETECTION AND MITIGATION OF DENIAL-OF-SERVICE ATTACKS

TECHNICAL FIELD

This disclosure relates to the automatic detection and mitigation of network abuse such as denial of service (DoS) attacks.

BACKGROUND

Network abuse is typically defined as use of a computer network for purposes prohibited by the network's acceptable use policy. A common example of network abuse is a denial-of-service (DoS) attack. A DoS attack occurs when legitimate users are unable to access information systems, devices, or other network resources due to the actions of one or more malicious actors. Services affected may include email, websites, online accounts (e.g., banking), or other services that rely on the affected computer or network. A DoS attack is typically accomplished by flooding the targeted host or network with network traffic until the target cannot respond (e.g., crashes), which prevents access for legitimate users. Many types of network abuse mimic legitimate traffic in order to escape detection and mitigation. These attacks and other network abuse can cost an organizations both time and money by rendering resources and services inaccessible SUMMARY One aspect of the disclosure provides a computer-implemented method that when executed by data processing hardware causes the data processing hardware to perform operations. The operations include obtaining a first set of network traffic messages representative of network traffic currently received by a network service. The operations also include determining, via a first model, whether network abuse is occurring based on the first set of network traffic messages. When the network abuse is occurring, the operations include obtaining a second set of network traffic messages representative of network traffic currently received by the network service. The operations also include, for each network traffic message in the second set of network traffic messages, labeling, via a second model, the network traffic message as an abusing network traffic message participating in the network abuse or a non-abusing network traffic message not participating in the network abuse. The method includes generating, via a third model, at least one network traffic rule. Each network traffic rule is configured to be implemented by a firewall and, when implemented, reduce an effect of the abusing network traffic messages.

Implementations of the disclosure may include one or more of the following optional features. In some implementations, the first set of network traffic messages includes a plurality of network traffic windows. Each of the plurality of network traffic windows include a subset of network traffic messages of the first set of network traffic messages associated with a different discrete portion of time. In some examples, the operations further include, for each of the plurality of network traffic windows, sampling a set of sampled network traffic messages from the subset of network traffic messages. The set of sampled network traffic messages is representative of the entirety of the subset of network traffic messages. Optionally, the operations further include storing, in a data structure, characteristics of the set of sampled network traffic messages for each of the plurality of network traffic windows.

In some implementations, determining whether the network abuse is occurring includes generating, by the first model, an abuse probability score and determining that the abuse probability score satisfies an abuse probability threshold. In some examples, the first model includes a neural network trained on sets of labeled network traffic messages. The operations may further include, after determining that network abuse is occurring, receiving feedback indicating that the occurring network abuse was either a false positive or actual network abuse and updating the first model based on the feedback.

In some examples, the operations further comprise obtaining a set of historical network traffic messages representative of network traffic received by the network service in the past. The set of historical network traffic messages may be representative of network traffic received by the network service prior to the network abuse. Labeling the network traffic message as an abusing network traffic message participating in the network abuse or a non-abusing network traffic message not participating in the network abuse may be based on the set of historical network traffic messages. The operations may further include providing the generated at least one network traffic rule to a user associated with the network service and receiving an indication from the user accepting one of the generated at least one network traffic rule. The operations may also further include implementing the accepted network traffic rule indicated by the user.

Optionally, the operations further include receiving user preferences associated with desired network traffic rules and selecting one of the generated at least one network traffic rule based on the user preferences. The operations optionally also further include implementing the selected network traffic rule. In some examples, the user preferences include an amount of non-abusing network traffic messages that may be affected by the selected network traffic rule. In some implementations, the network abuse includes a denial-of-service attack.

Another aspect of the disclosure provides a system for detecting and mitigating network abuse. The system includes data processing hardware and memory hardware in communication with the data processing hardware. The memory hardware stores instructions that when executed on the data processing hardware cause the data processing hardware to perform operations. The operations include obtaining a first set of network traffic messages representative of network traffic currently received by a network service. The operations also include determining, via a first model, whether network abuse is occurring based on the first set of network traffic messages. When the network abuse is occurring, the operations include obtaining a second set of network traffic messages representative of network traffic currently received by the network service. The operations also include, for each network traffic message in the second set of network traffic messages, labeling, via a second model, the network traffic message as an abusing network traffic message participating in the network abuse or a non-abusing network traffic message not participating in the network abuse. The method includes generating, via a third model, at least one network traffic rule. Each network traffic rule is configured to be implemented by a firewall and, when implemented, reduce an effect of the abusing network traffic messages.

This aspect may include one or more of the following optional features. In some implementations, the first set of network traffic messages includes a plurality of network traffic windows. Each of the plurality of network traffic windows include a subset of network traffic messages of the first set of network traffic messages associated with a different discrete portion of time. In some examples, the operations further include, for each of the plurality of network traffic windows, sampling a set of sampled network traffic messages from the subset of network traffic messages. The set of sampled network traffic messages is representative of the entirety of the subset of network traffic messages. Optionally, the operations further include storing, in a data structure, characteristics of the set of sampled network traffic messages for each of the plurality of network traffic windows.

In some implementations, determining whether the network abuse is occurring includes generating, by the first model, an abuse probability score and determining that the abuse probability score satisfies an abuse probability threshold. In some examples, the first model includes a neural network trained on sets of labeled network traffic messages. The operations may further include, after determining that network abuse is occurring, receiving feedback indicating that the occurring network abuse was either a false positive or actual network abuse and updating the first model based on the feedback.

In some examples, the operations further comprise obtaining a set of historical network traffic messages representative of network traffic received by the network service in the past. The set of historical network traffic messages may be representative of network traffic received by the network service prior to the network abuse. Labeling the network traffic message as an abusing network traffic message participating in the network abuse or a non-abusing network traffic message not participating in the network abuse may be based on the set of historical network traffic messages. The operations may further include providing the generated at least one network traffic rule to a user associated with the network service and receiving an indication from the user accepting one of the generated at least one network traffic rule. The operations may also further include implementing the accepted network traffic rule indicated by the user.

Optionally, the operations further include receiving user preferences associated with desired network traffic rules and selecting one of the generated at least one network traffic rule based on the user preferences. The operations optionally also further include implementing the selected network traffic rule. In some examples, the user preferences include an amount of non-abusing network traffic messages that may be affected by the selected network traffic rule. In some implementations, the network abuse includes a denial-of-service attack.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As network services become more and more ubiquitous, network abuse has become similarly common. Attacks such as denial-of-service (DoS) attacks are frequently employed to deny access to resources and services to legitimate users. These attacks and other network abuses can cause significant disruptions which cost organizations both time and money. Organizations and cloud service providers actively employ network traffic rules to attempt to mitigate network abuse, however, there are a wide variety of attacks that exist and many attacks look like legitimate traffic. Because blocking legitimate traffic defeats the purpose of mitigating the network abuse, detection and mitigation of network abuse is generally a complicated and labor intensive endeavor.

Traditionally, network administrators enforce network abuse defense through a mix of manual network traffic rules (e.g., put in place via firewalls) and via software defined rules for specific applications. However, with the emergence of off-premises, cloud-based services, network administrators frequently now instead rely on the cloud provider's infrastructure to manage and enforce the network traffic rules and/or policies. Conventional techniques fail to address issues with a fine granularity. That is, some conventional techniques identify when attacks are happening, but fail to identify what portions of network traffic are part of the attack and what portions of the network traffic are legitimate. These techniques typically are poor at detecting whether an increase in traffic is network abuse or legitimate traffic, leading to false positives. Additionally, conventional techniques lack any proper scaling and instead are too computationally expensive to be run live (i.e., in "real-time") and/or require or rely on skilled humans to react. Such skilled humans are generally expensive with relatively slow reaction times.

Implementations herein are directed toward a network abuse mitigator that divides mitigation into a fast detection phase that determines when network abuse occurs in or close real-time and a relatively slower traffic classification phase. The detection algorithm runs continuously to detect when network abuse is in progress. When the detection algorithm determines that network abuse is in progress, a signature generation algorithm classifies some or all of the network traffic as either normal (i.e., legitimate) traffic or abuse traffic. The signature generation algorithm extracts key characteristics of the abuse traffic and generates one or more network traffic rules designed to reduce an effect of the abusing traffic (e.g., block the abusing traffic). Thus, in some implementations, the network abuse mitigator detects and mitigates network abuse in real-time without the need of human intervention.

Figure 1:
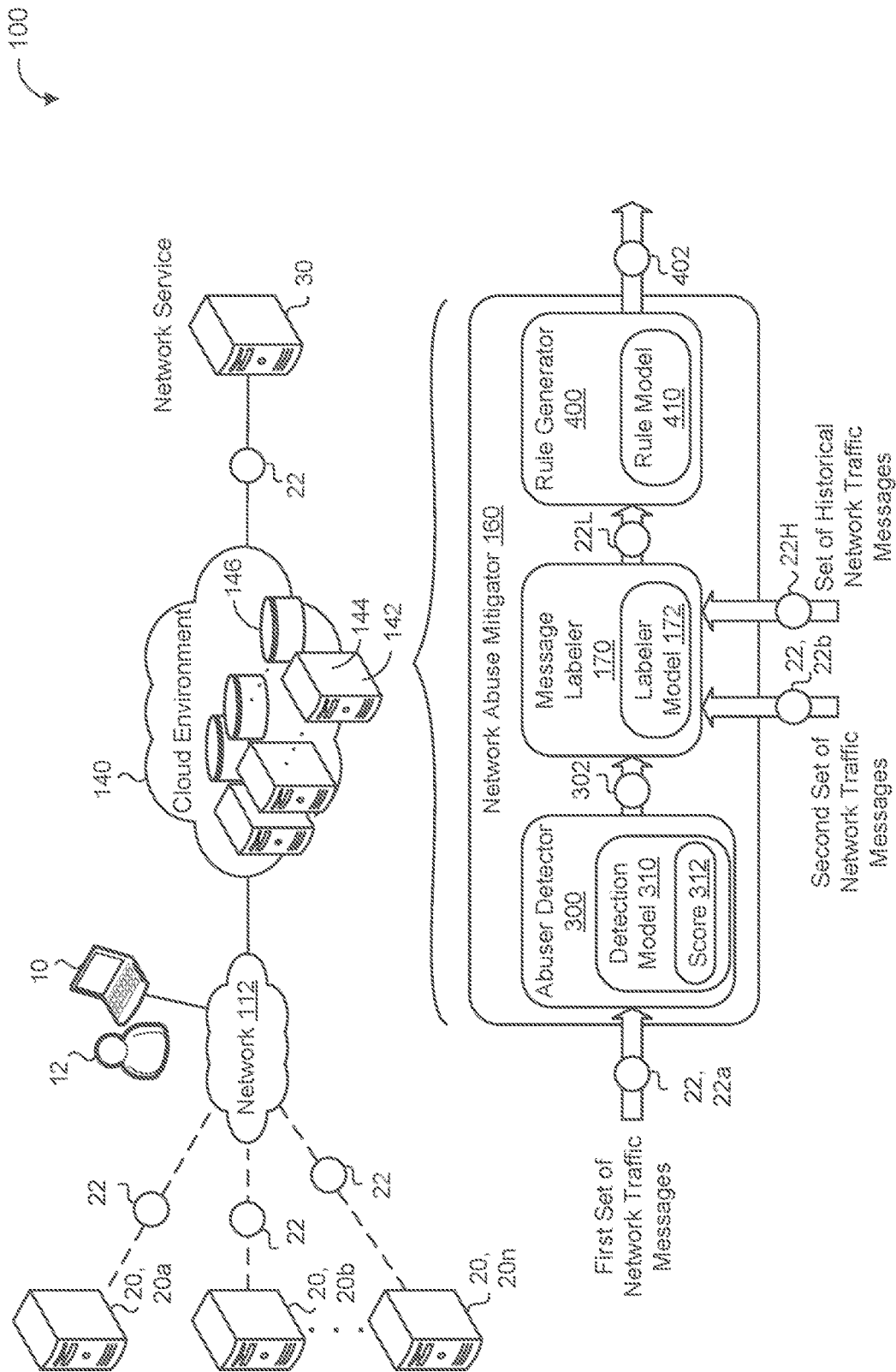
FIG. 1 is a schematic view of an example system for detecting and mitigating network abuse.

Referring to FIG. 1, in some implementations, an example system 100 includes a remote system 140 in communication with a plurality of remote computing devices 20, 20a-n via a network 112. The remote system 140 may be a single computer, multiple computers, or a distributed system (e.g., a cloud environment) having scalable/elastic computing resources 144 (e.g., data processing hardware) and/or storage resources 142 (e.g., memory hardware). The remote computing devices 20 may be any networked computing device accessible via the network 112 (e.g., via the Internet).

The remote system 140 also includes one or more network services 30. The network service 30 provides network related services on behalf of a user 12 (e.g., a customer, client, administrator, etc. of the remote system 140) who communicates with the remote system 140 via a user device 10 through the same or different network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The network service 30 provides the user 12 with the resources of a cloud network (e.g., the remote system 140) for services such as hosting, load balancing, routing, etc. For example, the user 12 hosts a resource (e.g., a website) and the network service 30 provides access to the resource to the plurality of remote computing devices 20 via the Internet (i.e., the network 112) through the cloud environment of the remote system 140. To help protect the network service 30 from network abuse, the remote system 140 executes a network abuse mitigator 160.

The network abuse mitigator 160 monitors network traffic messages 22 communicated between the remote computing devices 20 and the network service 30 for network abuse. Network abuse is defined as use of a computer network in a manner prohibited by user policy. Typical network abuse includes actions such as denial of service (DoS) attacks, distributed denial of service (DDoS) attacks, page scraping, and credential stuffing attacks. Network abuse typically results in degraded or lost service that can cause significant disruption and loss of resources (e.g., time, money, etc.). For example, a DDoS attack is a malicious attempt to disrupt network traffic to a network service by overwhelming the network service (or its supporting infrastructure) with a large amount of network traffic. However, because it is undesirable to block legitimate traffic, as this amounts to the goal of the DDoS attack, mitigating such network abuse is challenging.

The network abuse mitigator 160 includes an abuse detector 300. The abuse detector 300 obtains a first set of network traffic messages 22, 22a that are representative of network traffic currently received by the network service 30. That is, the abuse detector 300 obtains real-time or near real-time network traffic messages 22 destined for the network service 30 from one or more of the remote computing devices 20. In some examples, the network traffic messages are some or all of L7 (i.e., HTTP) header fields.

Figure 2:
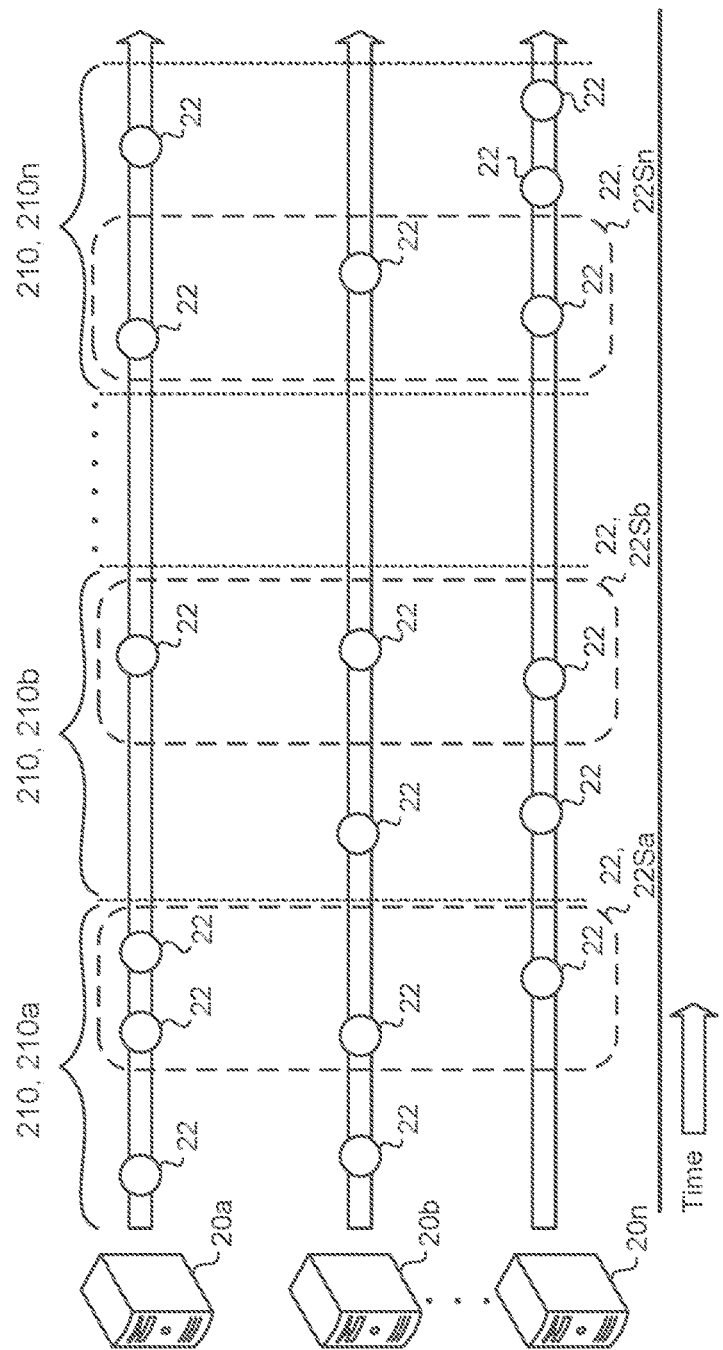
FIG. 2 is a schematic view of exemplary network traffic windows for network traffic messages.

Referring now to FIG. 2, in some examples, the first set of network traffic messages 22 includes a plurality of network traffic windows 210, 210a-n. As shown in schematic view 200, each network traffic window 210 includes a subset of network traffic messages 22 of the first set of network traffic messages 22 associated with a different discrete portion of time. In the schematic view 200, the x-axis denotes the passage of time and each network traffic window 210 spans a portion of that time. That is, when the first set of network traffic messages 22 includes all network traffic messages 22 obtained by the abuse detector 300 over time, each network traffic window 210 represents a subset of those network traffic messages 22 received over a discrete portion of time (e.g., 15 seconds, 30 seconds, 1 minute, etc.). The "size" of each network traffic window 210 (i.e., the length of the discrete portion of time) may be uniform or be dynamic based on changing traffic trends. For example, when the density of the network traffic messages 22 increases, the size of one or more network traffic windows 210 may decrease.

In some implementations, for each of the plurality of network traffic windows 210, the abuse detector 300 samples a set of sampled network traffic messages 22, 22Sa-n from the subset of network traffic messages 22 of the network traffic window 210. The set of sampled network traffic messages 22S is representative of the entirety of the subset of network traffic messages 22 of the network traffic window 210. That is, in some scenarios, the amount of network traffic messages 22 makes it unfeasible or undesirable to analyze or process every network traffic message 22 and instead the abuse detector 300 samples a representative set of sampled network traffic messages 22S to reduce the overall number of network traffic messages 22 to analyze while simultaneously retaining any characteristics or trends of the entire subset of network traffic messages 22 of the network traffic window 210. The abuse detector 300 may use any conventional sampling techniques to obtain the set of sampled network traffic messages 22S.

Optionally, the abuse detector 300 stores, in a data structure, characteristics of the set of sampled network traffic messages 22S for each of the plurality of network traffic windows 210. That is, instead of storing an entirety of the information associated with each of the sampled network traffic messages 22S for each network traffic window 210, the abuse detector 300 may distill the set of sampled network traffic messages 22S down into specific characteristics (e.g., bandwidth, size, source address, destination address, regions, etc.) to reduce the storage requirements for the set of sampled network traffic messages 22S. For example, the abuse detector 300 may store some or all of header fields of the sampled network traffic messages 22S or trends or aggregated statistics of values of the one or more header fields of the sampled network traffic messages 22S. Optionally, the aggregated statistics use a probabilistic data structure (e.g., a count-min sketch).

Referring back to FIG. 1, the abuse detector 300 determines, via a detection model 310, whether network abuse is occurring based on the first set of network traffic messages 22. That is, as discussed in more detail below, the abuse detector 300 determines, based on processing the network traffic messages 22 with the detection model 310, whether network abuse is currently occurring. The detection model 310 may incorporate any type of model including an algorithm based on statistics of the network traffic messages 22 or a neural network. In some examples, an abuse determination 302 by the abuse detector 300 is dependent upon a single network traffic window 210. In other examples, the abuse determination 302 is dependent upon a plurality of network traffic windows 210. That is, in these examples, the abuse detector includes sufficient memory to retain aspects of some number of previous network traffic windows 210 while determining whether network abuse is occurring in the current network traffic window 210. For example, the abuse detector 300 may determine whether network abuse is currently occurring based on the current network traffic window 210 and the previous three network traffic windows 210.

In some implementations, the abuse detector 300 converts the first set of network traffic messages 22 into a set of time series prior to providing the data to the detection model 310. For example, the abuse detector 300 determines a distribution for one or more characteristics of the network traffic messages 22 (e.g., a distribution for each L7 header field) to determine the relative frequency of observed values. The abuse detector 300 may determine differences based on these distributions in different network traffic windows 210 using, for example, the Jensen-Shannon divergence to generate the set of time series. The detection model 310 is trained to detect traffic anomalies in these time series that represent various characteristics and trends of the network traffic messages (such as the current messages per second or various fields in the headers of the network traffic messages).

In some examples, the detection model 310 generates an abuse probability score 312. When the abuse detector 300 determines that the abuse probability score satisfies an abuse probability threshold, the abuse detector 300 determines that the detection model 310 has detected current network abuse and transmits the abuse determination 302 to a message labeler 170.

Figure 3:
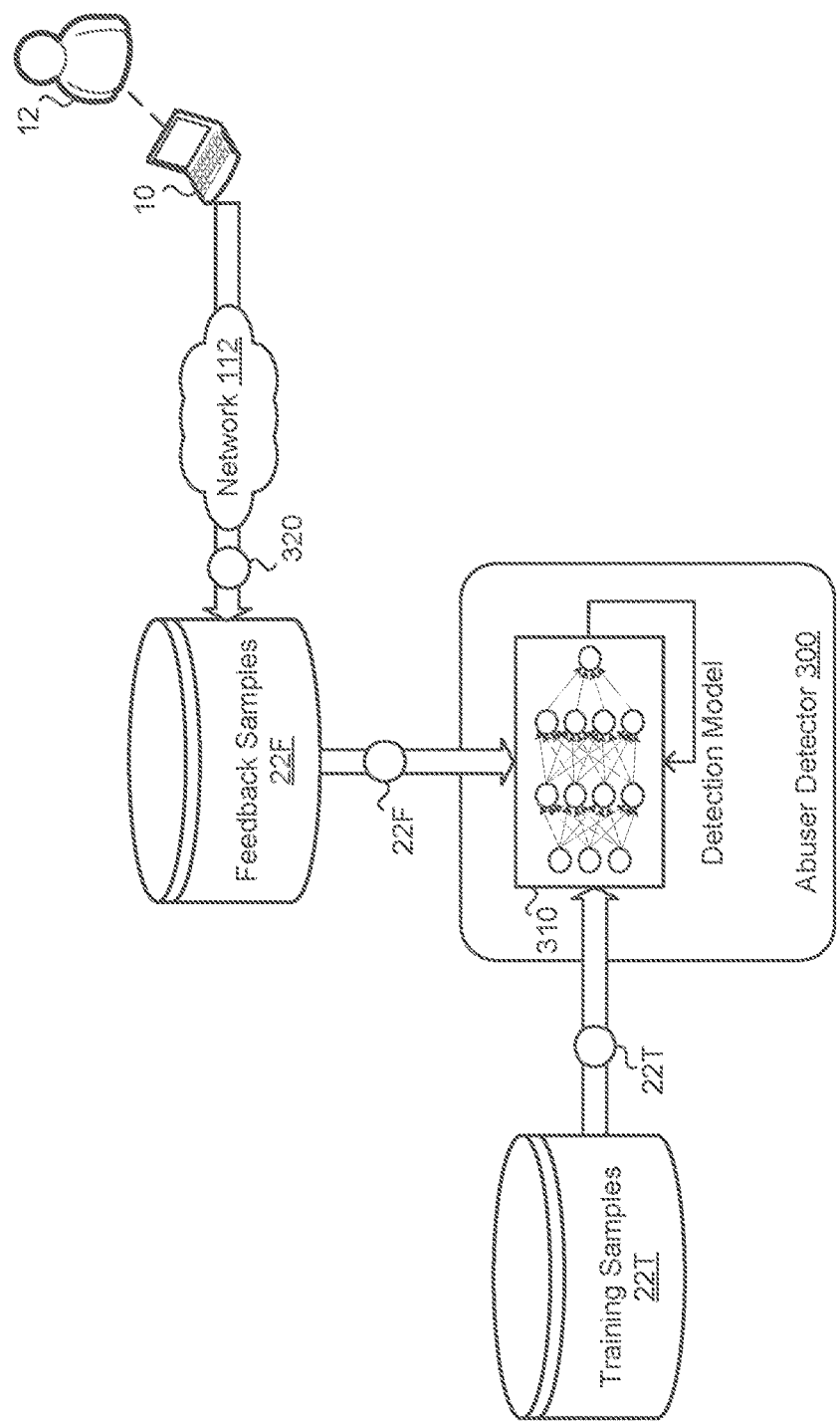
FIG. 3 is a schematic view of exemplary components of the system of FIG. 1.

Referring now to FIG. 3, in some examples, the detection model 310 includes a neural network (such as a long short-term memory (LTSM) neural network) trained on a set of training network traffic samples 22T. In some implementations, each training network traffic sample 22T is labeled. That is, each training network traffic sample 22T includes a label that indicates whether the training network traffic sample 22T is a sample that the detection model 310 should predict as an abusive network traffic sample or a legitimate network traffic sample. In some examples, the subset of the training network traffic samples 221' include positive labels indicative of legitimate network traffic samples and a remaining subset of the training network traffic samples 22T include negative labels indicative of abusive network traffic samples. After the detection model 310 makes a prediction for a labeled training network traffic sample 22T, the detection model 310 compares its prediction to the label (e.g., via a loss formula) and adjusts parameters of the model 310 accordingly (e.g., via gradient descent) to learn to predict the appropriate label. The training network traffic samples 22T may be simulated or historical network traffic samples. The historical network traffic samples may be network traffic messages previously received by the network service 30 the detection model is trained to monitor and/or previously received by other network services.

In some implementations, the network abuse mitigator 160, after the abuse detector 300 generates the abuse determination 302 (i.e., the abuse detector 300 determines that network abuse is currently occurring), receives feedback 320 indicating whether network abuse was actually occurring when the abuse detector 300 made the determination. That is, the feedback 320 indicates whether the abuse detector 300 was correct or incorrect (i.e., a false positive). The network abuse mitigator 160 may receive the feedback 320 from the user 12 via the user device 10. For example, the user 12, after receiving a notification 404 (FIG. 4) of the network abuse, the user 12 investigates and determines that network abuse was or was not occurring and provides the feedback 320 accordingly. The remote system 140 may also provide the feedback 320. For example, after the abuse detector determines that network abuse is occurring, a more sophisticated and/or more time-consuming network traffic analyzer may determine whether network abuse occurred.

In some examples, the detection model 310 is only updated based on network traffic messages 22 received by the network service 30 associated with the user 12 and the detection model 310 (i.e., the network services(s) the detection model 310 is monitoring). In other examples, the detection model 310 is updated based on network traffic messages 22 received by other detection models 310 monitoring other network services 30. For example, a cloud environment may execute many network services 30 and employ many different detection models 310 to protect these network services 30. Each detection model 310 may receive different network traffic messages 22 which may be used to update other detection models 310. In some examples, the user 12 may opt out or opt in of the global detection model 310 updating.

The network abuse mitigator 160 may treat the feedback 320 as labels to apply to network traffic messages 22 obtained during the time period of the determined network abuse. That is, the network abuse mitigator 160 may update or fine-tune or retrain the detection model 310 based on feedback samples 22F generated from the feedback 320 to increase the accuracy of the detection model 310.

Referring again back to FIG. 1, while the network abuse is occurring (i.e., the abuse detector 300 has sent the abuse determination 302 to the message labeler 170), the message labeler 170 obtains a second set of network traffic messages 22, 22b representative of network traffic currently received by the network service 30. In some examples, the second set of network traffic messages 22 is the same as the first set of network traffic messages 22 (i.e., the set of network traffic messages 22 that the abuse detector 300 obtained). In other examples, the message labeler obtains at least a partially different set of network traffic messages 22. For example, the message labeler 170 obtains a more recent or larger or smaller set of network traffic messages 22.

The message labeler 170, in some examples, also obtains a set of historical network traffic messages 22H. These historical network traffic messages 22H (or characteristics of historical network traffic messages 22H) include network traffic messages 22 captured during one or previous network traffic windows 210 that likely predate the network abuse. For example, the abuse detector 300 may store the first set of network traffic messages 22 (or the set of sampled network traffic messages 22S or the characteristics of the set of sampled network traffic messages 22S) for a previous period of time (e.g., 24 hours, 48 hours, etc.). The message labeler 170 obtains the set of historical network traffic messages 22H on the premise that there is a high degree of likelihood that the obtained set of historical network traffic messages 221H are primarily associated with legitimate traffic. That is, it is likely that network abuse was not occurring during the period of time represented by the set of historical network traffic messages 22H and thus the historical network traffic messages 22H represent primarily legitimate traffic. While not required, the set of historical network traffic messages 22H may improve the quality and/or accuracy of the message labeler 170 by providing the message labeler 170 potential context of baseline traffic for the network service 30.

For each network traffic message 22 in the second set of network traffic messages, the message labeler 170, via a labeler model 172, using the set of historical network traffic messages 22H, labels the network traffic message as either an abusing network traffic message 22 that is participating in the network abuse or a non-abusing network traffic message 22 that is not participating in the network abuse. That is, the message labeler 170 labels each network traffic message 22 in the second set of network traffic messages 22 as either legitimate traffic or non-legitimate traffic (i.e., abuse traffic) based on the set of historical network traffic messages 22H that are primarily associated with legitimate traffic. The message labeler 170 thus generates a set of labeled network traffic messages 22L that includes a label (i.e., abuse or legitimate) for each of the network traffic messages 22 of the second set of network traffic messages 22.

In some implementations, the labeler model 172 uses the set of historical network traffic messages (or characteristics of the messages such as distributions of header fields) to determine baseline or normal traffic for the network service 30. The labeler model I72, based on the probabilities of seeing particular values in the set of historical network traffic messages 22H and the probabilities of seeing the same particular values in the second set of network traffic messages 22 (i.e., the current messages), may separate normal traffic from abuse traffic by mapping points to a multi-dimensional space (e.g., one dimension for each header field the network abuse mitigator 160 monitors). The labeler model 172 may cluster the points in the multi-dimensional space to allow for separation of the normal and abuse traffic. In some implementations, the labeler model 172 measures a sum of the Jensen-Shannon divergence for each header field from the baseline distributions for the cluster of normal traffic and the cluster of abuse traffic. The labeler model 172 may determine that the cluster with the higher divergence is the cluster of abuse traffic.

In some examples, the network abuse mitigator 160 does not include the detection model 310 or abuse detector 300 and the message labeler 170 does not receive the abuse determination 302. In this scenario, the message labeler 170 may act as the detection model 310 by determining that network abuse is occurring when a sufficient number of network traffic messages 22 are labeled as abusive. For example, when a total number or a percentage of the network traffic messages 22 satisfy a threshold, the message labeler 170 may determine that network abuse is occurring.

The message labeler 170 transmits the set of labeled network traffic messages 22L to a rule generator 400. The rule generator 400 generates, via a rule model 410, at least one network traffic rule 402 that, when implemented, reduces an effect of the abusing network traffic messages 22. That is, in some examples, the rule generator 400 receives the labeled network traffic messages 22L and derives network traffic rules 402 that mitigate the network abuse based on the labeled network traffic messages 22L. For example, the network traffic rules block or discard some portion of the labeled network traffic messages 22L that are labeled as abusive. The network traffic rules are implemented, optionally, at a firewall. In a specific example, the rule generator 400 may determine that a majority of the abusive labeled network traffic messages 22L originate from a particular geographic area. In this scenario, the rule generator 400 may generate a network traffic rule 402 that blocks network traffic messages from that particular geographic area. The network traffic rule 402 may block or divert network traffic messages 22 based on any number of characteristics (e.g., header fields) of the network traffic messages 22 based on whatever characteristics the abusive traffic has most in common.

Figure 4:
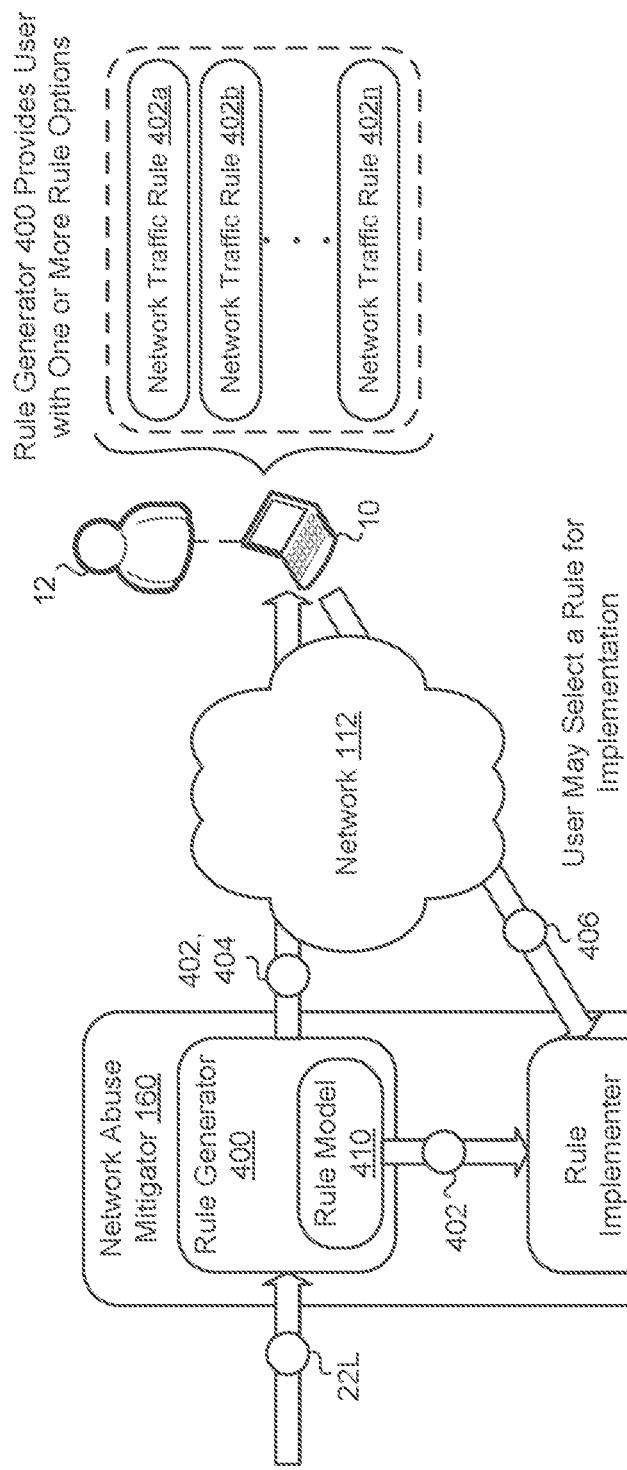
FIG. 4 is a schematic view of additional exemplary components of the system of FIG. 1.

Referring now to FIG. 4, the rule generator 400 includes the rule model 410 which is a rule generating algorithm that generates rules that are applicable network traffic rules 402. In general, the rule generator 400 attempts to generate a rule that mitigates a maximum amount of abusive network traffic and affects a minimum amount of legitimate traffic. In some examples, these goals are in contention. That is, with some examples of network abuse, the more abusive traffic that is blocked, the more legitimate traffic that is also blocked. To this end, the rule generator 400, in some implementations, generates a plurality of network traffic rules 402, 402a-n. The network abuse mitigator 160 may transmit the plurality of network traffic rules 402 to the user 12 associated with the network service 30 via the user device 10 along with a notification 404 that indicates the ongoing network abuse. In some examples, the network abuse mitigator 160 transmits just the notification 404 to the user 12 and waits for a response from the user 12 prior to taking any action (e.g., generating the one or more network traffic rules 402).

The user 12 may evaluate the effects each proposed network traffic rule 402 would have on current network traffic and select the network traffic rule 402 most acceptable to the user's goals or desires. The network abuse mitigator 160 may include models, reports, and/or statistics that clearly demonstrate to the user 12 the effects of each of the proposed network traffic rules 402. For example, a first network traffic rule 402 may block ninety-five percent of abusive traffic but also blocks ten percent of legitimate traffic while a second network traffic rule 402 may block only eighty percent of abusive traffic but only blocks one percent of legitimate traffic.

The user 12 may provide an indication 406 that indicates acceptance of one of the proposed generated network traffic rules 402 back to the network abuse mitigator 160. A rule implementer (e.g., a firewall) may implement the selected network traffic rule 402. In some examples, the network abuse mitigator 160 automatically implements, without user intervention, one of the network traffic rules 402. For example, the rule generator 400 may provide the network traffic rule 402 with a highest score that is determined from various factors (e.g., amount of abusive traffic blocked, amount of legitimate traffic blocked, degradation of service, etc.) and the rule implementer 420 may immediately implement the generated network traffic rule 402. In some examples, the user 12, at a later point in time, overrides the network traffic rule 402 by either disabling the network traffic rule 402 or selecting a different network traffic rule 402.

Figure 5:
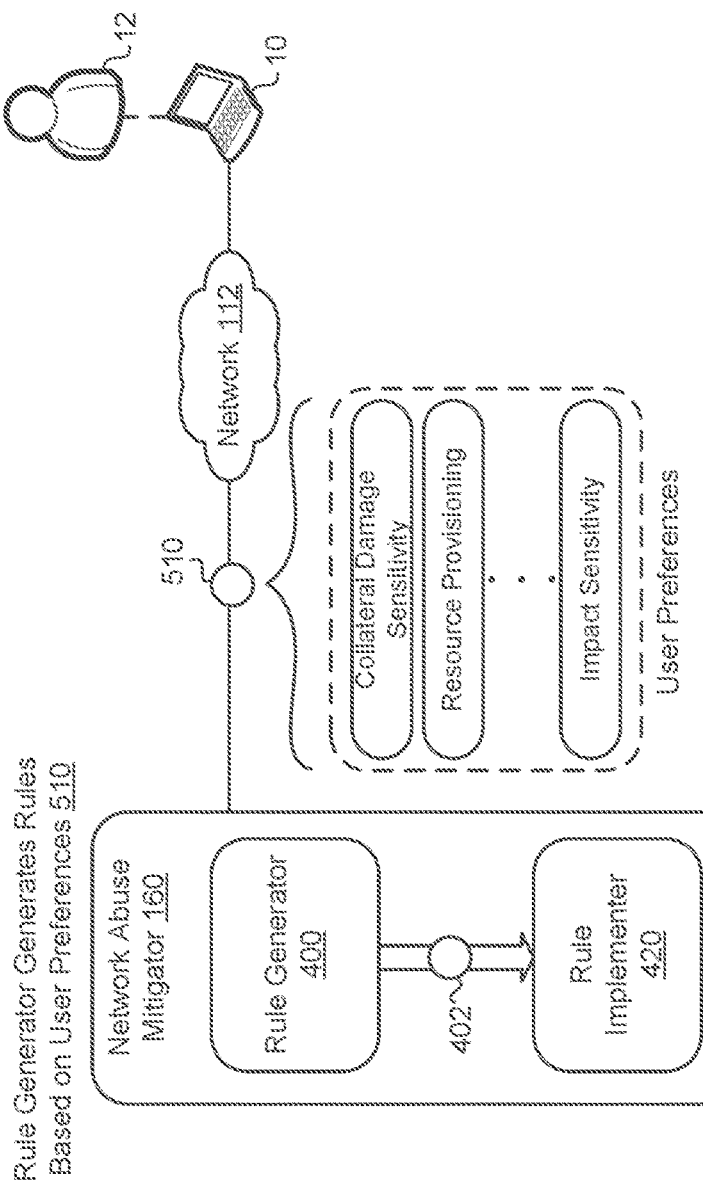
FIG. 5 is a schematic view of user preferences for network traffic rules.

Referring now to FIG. 5, optionally, the network abuse mitigator 160 receives, from the user 12 (e.g., via the user device 10), user preferences 510 associated with desired network traffic rules 402 or desired network traffic rule parameters. That is, the network abuse mitigator 160 may generate the network traffic rules 402 and/or select which network traffic rule 402 to implement based on the user preferences 510. The user preferences may include parameters such collateral damage sensitivity. Collateral damage refers to the amount of non-abusing or legitimate traffic that is affected by the network traffic rule. Thus, a user 12 with a high sensitivity to collateral damage has a strong aversion to blocking legitimate traffic while a user 12 with a low sensitivity to collateral damage does not have a strong aversion to blocking legitimate traffic. This sensitivity may be highly dependent on the type and nature of the network service 30 in addition the preference of the user 12.

Other user preferences 510 include resource provisioning (i.e., how many resources are allocated to the network service 30 and/or the user 12 and how many resources may be allocated to the network service 30), cost sensitivity (i.e., when the user 12 pays for resources consumed by the network service 30 and/or its infrastructure), and impact sensitivity (i.e., how sensitive the user 12 is to degradation or loss of access to the network service 30). Based on the user preferences 510, the network abuse mitigator 160 may select one of the plurality of network traffic rules 402 generated by the rule generator 400 and the rule implementer 420 may implement the selected network traffic rule 402 automatically without human intervention.

Figure 6:
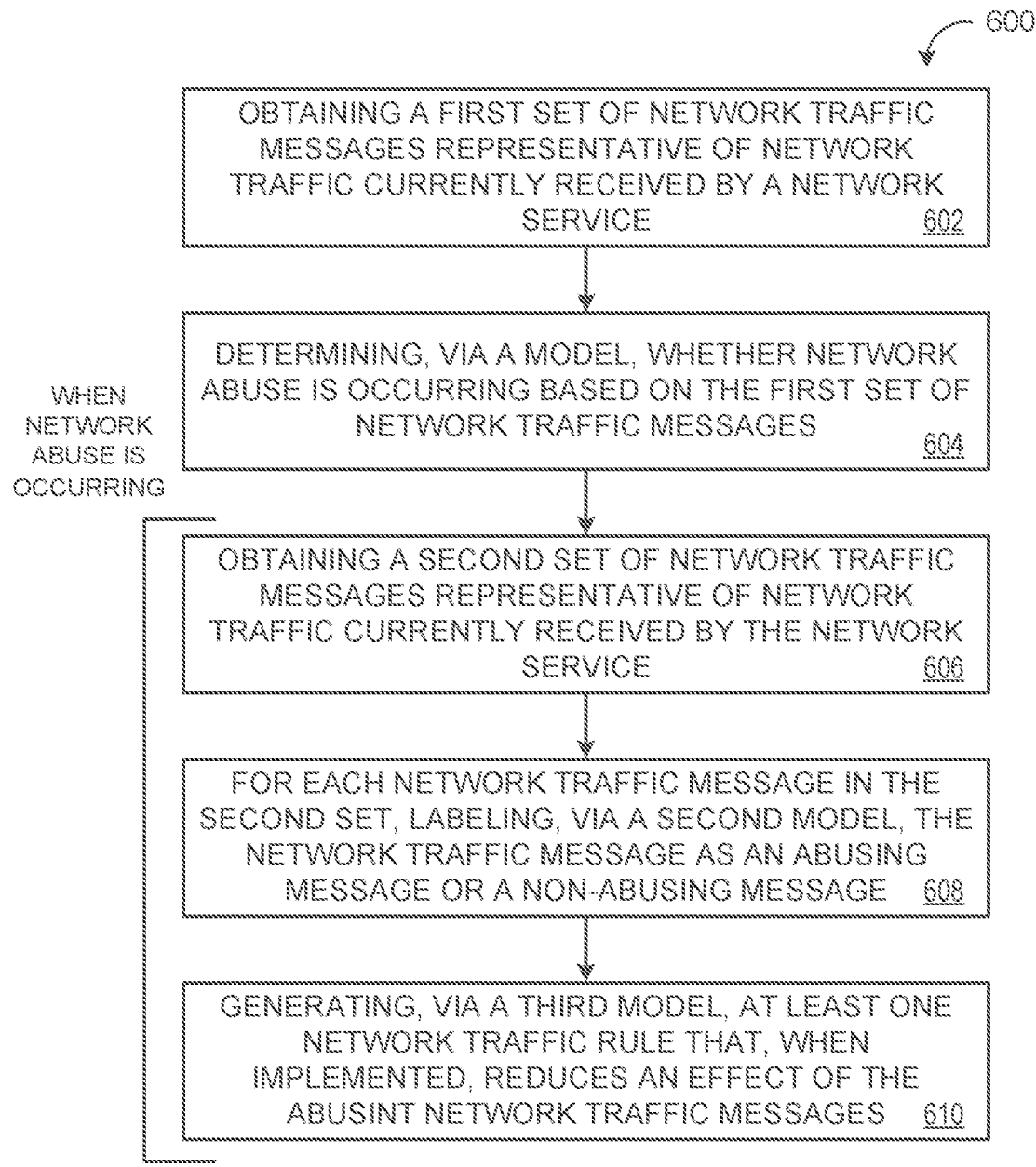
FIG. 6 is a flowchart of an example arrangement of operations for a method of detecting and mitigating network abuse.

FIG. 6 is a flowchart of an exemplary arrangement of operations for a method 600 of automatically detecting and mitigating network abuse such as denial of service attacks. The method 600, at operation 602, includes obtaining a first set of network traffic messages 22 representative of network traffic currently received by a network service 30. At operation 604, the method 600 includes determining via a first model 310, whether network abuse is occurring based on the first set of network traffic messages 22. When the network abuse is occurring, the method 600, at operation 606, includes obtaining a second set of network traffic messages 22 representative of network traffic currently received by the network service 30.

At operation 608, the method 600 includes, for each network traffic message 22 in the second set of network traffic messages 22, labeling, via a second model 170, the network traffic message 22 as an abusing network traffic message 22 participating in the network abuse or a non-abusing network traffic message 22 not participating in the network abuse. At operation 610, the method 600 includes generating via a third model 410, at least one network traffic rule 402. Each network traffic rule 402 is configured to be implemented by a firewall and, when implemented, reduce an effect of the abusing network traffic messages 22.

Figure 7:
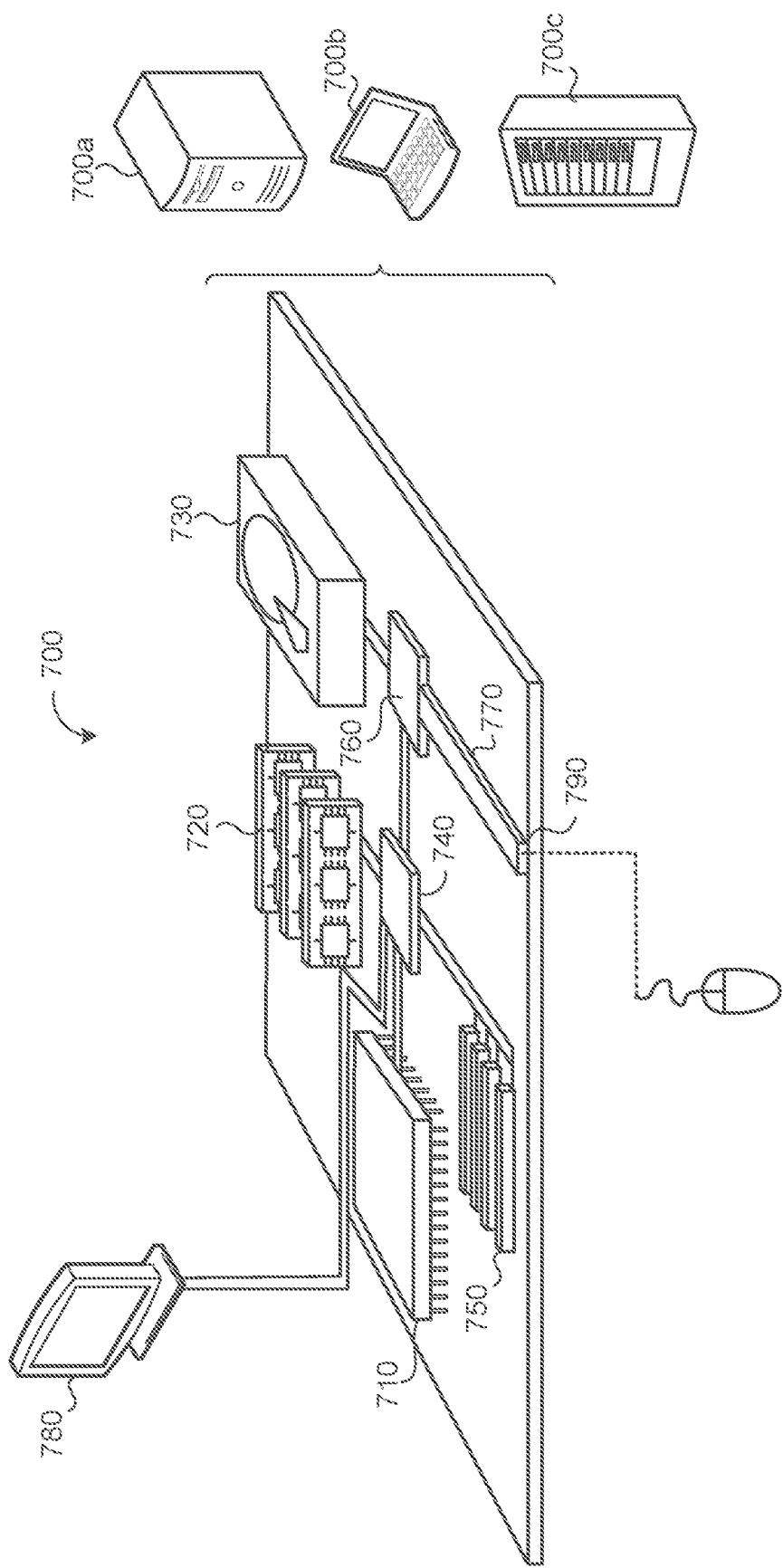
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   obtaining a first set of network traffic messages representative of network traffic currently received by a network service, wherein the first set of network traffic messages comprises a plurality of network traffic windows, each of the plurality of network traffic windows comprising a subset of network traffic messages of the first set of network traffic messages associated with a different discrete portion of time;
   for each of the plurality of network traffic windows, sampling a set of sampled network traffic messages from the subset of network traffic messages, the set of sampled network traffic messages representative of an entirety of the subset of network traffic messages;
   determining, via a first model, whether network abuse is occurring based on the first set of network traffic messages; and
   when the network abuse is occurring:
      obtaining a second set of network traffic messages representative of network traffic currently received by the network service;
      for each network traffic message in the second set of network traffic messages, labeling, via a second model, the network traffic message as an abusing network traffic message participating in the network abuse or a non-abusing network traffic message not participating in the network abuse; and
      generating, via a third model, at least one network traffic rule, each network traffic rule configured to be implemented by a firewall and, when implemented, reduce an effect of the abusing network traffic messages.

2. The method of claim 1, wherein the operations further comprise storing, in a data structure, characteristics of the set of sampled network traffic messages for each of the plurality of network traffic windows.

3. The method of claim 2, wherein the operations further comprise, after determining that network abuse is occurring:
   receiving feedback indicating that the occurring network abuse was either a false positive or actual network abuse; and
   updating the first model based on the feedback.

4. The method of claim 1, wherein determining whether the network abuse is occurring comprises:
   generating, by the first model, an abuse probability score; and
   determining that the abuse probability score satisfies an abuse probability threshold.

5. The method of claim 1, wherein the first model comprises a neural network trained on sets of labeled network traffic messages.

6. The method of claim 1, wherein the operations further comprise:
   obtaining a set of historical network traffic messages representative of network traffic previously received by the network service,
   wherein the set of historical network traffic messages is representative of network traffic previously received by the network service prior to the network abuse, and
   wherein labeling the network traffic message as an abusing network traffic message participating in the network abuse or a non-abusing network traffic message not participating in the network abuse is based on the set of historical network traffic messages.

7. The method of claim 1, wherein the operations further comprise:
providing the generated at least one network traffic rule to a user associated with the network service;
receiving an indication from the user accepting one of the generated at least one network traffic rule; and
implementing the accepted network traffic rule indicated by the user.

8. The method of claim 1, wherein the operations further comprise:
receiving user preferences associated with desired network traffic rules;
selecting one of the generated at least one network traffic rule based on the user preferences; and
implementing the selected network traffic rule.

9. The method of claim 8, wherein the user preferences comprise an amount of non-abusing network traffic messages that may be affected by the selected network traffic rule.

10. The method of claim 1, wherein the network abuse comprises a denial-of-service attack.

11. A system comprising:
data processing hardware; and
memory hardware in communication with the data processing hardware, the memory hardware storing instructions that when executed on the data processing hardware cause the data processing hardware to perform operations comprising:
obtaining a first set of network traffic messages representative of network traffic currently received by a network service, wherein the first set of network traffic messages comprises a plurality of network traffic windows, each of the plurality of network traffic windows comprising a subset of network traffic messages of the first set of network traffic messages associated with a different discrete portion of time;
for each of the plurality of network traffic windows, sampling a set of sampled network traffic messages from the subset of network traffic messages, the set of sampled network traffic messages representative of an entirety of the subset of network traffic messages;
determining, via a first model, whether network abuse is occurring based on the first set of network traffic messages; and
when the network abuse is occurring:
obtaining a second set of network traffic messages representative of network traffic currently received by the network service;
for each network traffic message in the second set of network traffic messages, labeling, via a second model, the network traffic message as an abusing network traffic message participating in the network abuse or a non-abusing network traffic message not participating in the network abuse; and
generating, via a third model, at least one network traffic rule, each network traffic rule configured to be implemented by a firewall and, when implemented, reduce an effect of the abusing network traffic messages.

12. The system of claim 11, wherein the operations further comprise storing, in a data structure, characteristics of the set of sampled network traffic messages for each of the plurality of network traffic windows.

13. The system of claim 12, wherein the operations further comprise, after determining that network abuse is occurring:
receiving feedback indicating that the occurring network abuse was either a false positive or actual network abuse; and
updating the first model based on the feedback.

14. The system of claim 11, wherein determining whether the network abuse is occurring comprises:
generating, by the first model, an abuse probability score; and
determining that the abuse probability score satisfies an abuse probability threshold.

15. The system of claim 11, wherein the first model comprises a neural network trained on sets of labeled network traffic messages.

16. The system of claim 11, wherein the operations further comprise:
obtaining a set of historical network traffic messages representative of network traffic previously received by the network service,
wherein the set of historical network traffic messages is representative of network traffic previously received by the network service prior to the network abuse, and
wherein labeling the network traffic message as an abusing network traffic message participating in the network abuse or a non-abusing network traffic message not participating in the network abuse is based on the set of historical network traffic messages.

17. The system of claim 11, wherein the operations further comprise:
providing the generated at least one network traffic rule to a user associated with the network service;
receiving an indication from the user accepting one of the generated at least one network traffic rule; and
implementing the accepted network traffic rule indicated by the user.

18. The system of claim 11, wherein the operations further comprise:
receiving user preferences associated with desired network traffic rules;
selecting one of the generated at least one network traffic rule based on the user preferences; and
implementing the selected network traffic rule.

19. The system of claim 18, wherein the user preferences comprise an amount of non-abusing network traffic messages that may be affected by the selected network traffic rule.

20. The system of claim 11, wherein the network abuse comprises a denial-of-service attack.

* * * * *